United States Patent [19]

Unger et al.

[11] Patent Number: 4,675,126

[45] Date of Patent: Jun. 23, 1987

[54] METHOD OF CLEANING EQUIPMENT FOR HANDLING REACTIVE MULTICOMPONENT MIXTURES OF HIGH VISCOSITY

[75] Inventors: Gerfried Unger, Frankfurt; Helmut Untucht, Nidderau; Wolfgang Winterstein, Karben, all of Fed. Rep. of Germany

[73] Assignee: Metallgesellschaft Aktiengesellschaft, Frankfurt am Main, Fed. Rep. of Germany

[21] Appl. No.: 805,847

[22] Filed: Dec. 5, 1985

[30] Foreign Application Priority Data

Dec. 5, 1984 [DE] Fed. Rep. of Germany ....... 3444293

[51] Int. Cl.$^4$ .................... C11D 7/30; C11D 7/32; C11D 7/50
[52] U.S. Cl. ................................. 252/153; 252/162; 252/171; 252/172; 134/38; 134/40
[58] Field of Search ............. 252/162, 171, 172, 153; 570/106, 111, 117, 118; 134/38, 40

[56] References Cited

U.S. PATENT DOCUMENTS

| | | | |
|---|---|---|---|
| 3,282,848 | 11/1966 | Haslam | 252/105 |
| 3,573,212 | 3/1971 | Ambros | 252/153 |
| 3,641,169 | 2/1972 | Crabb et al. | 252/171 |
| 3,762,952 | 10/1973 | Gouin et al. | 134/38 |
| 4,056,403 | 11/1977 | Cramer et al. | 134/22 R |
| 4,192,692 | 3/1980 | Herrmann | 134/2 |
| 4,438,192 | 3/1984 | Archer et al. | 430/329 |
| 4,572,792 | 2/1986 | Muller | 252/171 |

FOREIGN PATENT DOCUMENTS 246697 9/1963 Australia .
3325166 1/1985 Fed. Rep. of Germany .

Primary Examiner—Prince E. Willis
Attorney, Agent, or Firm—Karl F. Ross; Herbert Dubno

[57] ABSTRACT

A solvent-containing composition for the cleaning of equipment used to mix and handle reactive multicomponent mixtures of high viscosity, which react to form polymers. In order to improve the capacity of the solvent to dissolve the more or less polymerized mixtures, the solvent contains a chain-terminating agent. For binary systems containing liquid polysulfide polymers, the solvent contains a chain-terminating agent or chain-degrading agent containing mercapto group-containing compounds of the general formula R—SH or disulfide or polysulfide group-containing compounds of the general formula R—S$_n$—R, in which formulas n≧2 and R represents equal or difficult alkyl residues, aryl residues or substituted alkyl or aryl residues. For binary polyurethane systems, the solvent contains chain-terminating compounds which in their molecule contain a Zerewitinoff-active hydrogen atom and have the general formula HY—R$^1$, wherein

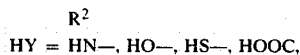

where R$^2$=H or alkyl
and R$^1$ is an organic radical which will not enter into polyaddition or polycondensation reactions with itself or with isocyanate groups.

9 Claims, No Drawings

METHOD OF CLEANING EQUIPMENT FOR HANDLING REACTIVE MULTICOMPONENT MIXTURES OF HIGH VISCOSITY

FIELD OF THE INVENTION

The present invention relates to a compound or composition for the cleaning of equipment for handling reactive multicomponent mixtures of high viscosity, particularly binary sealing and potting compounds of high viscosity.

BACKGROUND OF THE INVENTION

It is known to make sealing and potting compounds, i.e. compositions, from polymers and additives. Sealing compounds made from thermoplastic polymers, such as polyisobutylene, butyl rubber or thermoplastic rubbers can be handled relatively easily at elevated temperatures in suitable machines. Any residues may remain in the equipment and can be rendered flowable by the supply of heat so that they can be reused.

Single-component reactive sealing compounds which will vulcanize or thermally set when exposed to air moisture or oxygen, such as silicone-based sealing compounds, can also be handled without major difficulty. Such sealing compounds are used, e.g. to seal composite insulating glass panes. Cold-setting binary synthetic rubbers, e.g., such rubbers based on liquid polysulfide polymers or on polyurethanes, are used for the same purpose.

Binary compounds of high viscosity intended for use as sealing compounds, coating compounds or potting compounds are processed in suitable machines under high pressure.

In such equipment, the two components of the compound are fed from two separate supply vessels or containers and are proportioned to provide the proper mixing ratio. Thereafter the two components are brought together in a mixing head and a homogeneous mixture is made in a static and/or dynamic mixer.

To ensure that the machine will not be clogged by cured or set material, those parts of the machine which are filled with the mixture of components must be flushed when the operation is interrupted for a long time or is terminated. Such parts include the mixing head, the mixer, flexible tubing, any spray gun or nozzle.

Such flushing is effected in known manner by means of solvents or solvent mixtures which can dissolve the pastelike unreacted material. Such solvents may consist, e.g. of chlorinated hydrocarbons, such as methylene chloride.

It is also known to use rinsing systems in which no solvent is employed but a rinsing is effected with one component of the binary compound. In this case one attempts to inhibit the curing reaction by a strong dilution of one of the components of the mixture (EP-A 0059 380, U.S. Pat. No. 3,989,228).

But considerable difficulties are involved in that practice, particularly with highly reactive compounds since cured material can build up progressively on the surfaces or pipes and containers if the reactive mixture remains in the plant or equipment for an excessively long time owing to an insufficient rinsing section of the solvent, which is circulated by a pump.

This will finally result in a clogging and shutdown of the plant or system.

Another difficulty involved in a rinsing with solvents resides in that the reactive material will continue to react in the solvent if a concentration limit of about 10% is exceeded. That continued reaction results in the formation of gel-like precipitates so that the solvent can no longer be pumped and must be discarded.

OBJECT OF THE INVENTION

It is an object of the invention to avoid the above-mentioned disadvantages and to provide a cleaning compound or composition which permits the mixing or handling of reactive binary mixtures in the plant processing same to be interrupted or terminated without an occurrence of detrimental effects in or damage to the processing plant.

DESCRIPTION OF THE INVENTION

In a solvent-containing compound for the cleaning of equipment serving to mix and handle reactive multicomponent mixtures which are of high viscosity and react to form a polymer, this object is accomplished in that the solvent is provided with a chain-terminating agent.

That simple but effective additive controls the polymerization reaction of the polymer system which is to be rinsed and will quickly terminate the chains. The chain-terminating agent or inhibitor must be contained in the solvent in such quantities that the inhibitor can enter into an at least equimolar reaction with those groups of the polymer or cross-linking agent in the solvent which are capable of participating in the polymerization reaction.

Solvents which can be used within the scope of the invention include substances of the group consisting of chlorinated hydrocarbons, such as methylene chloride, trichloroethylene; also esters, such as ethyl acetate; 2-ethoxyethyl acetate; aromatic hydrocarbons, such as benzene, toluene; ketones, such as methyl ethyl ketone; cyclic ethers, such as tetrahydrofuran; dioxane; and dimethyl sulfoxide. If required by local conditions and the nature of the equipment, solvents for use with polysulfide systems may include aliphatic alcohols, water or mixtures thereof.

To accelerate the reaction, the inhibitors may be used in an excess, i.e. an amount in excess of that stoichiometrically required to react with the polymer scoured by the solvent. The chain-terminating agents or inhibitors used in accordance with the invention preferably react with the reactive polymer or with the cross-linking agent at a rate which is higher than the rate at which the prepolymer or the chain-extending agent reacts with itself with the cross-linking agent contained in the mixture.

In accordance with the invention a solvent of the kind mentioned above is provided with chain-terminating agents or inhibitors in conjunction with mixtures based on liquid polysulfide polymers and with mixtures based on viscous polyurethane components. The solvent preferably contains the chain-terminating agent in a quantity of 0.5 to 10 wt. %. That quantity will depend on the nature of the chain-terminating agent and on the polymer system involved. In some cases it may be desirable to use the chain-terminating agent in quantities in excess of 10wt. % and up to 30 wt. %.

The low-molecular liquid polysulfide polymers are used in practice as binary systems which are mixed only shortly before they are used. One component contains the liquid polysulfide polymer together with the fillers and additives. The other component contains the curing agent together with the oxidizers, plasticizers, accelerators, etc. In the liquid polysulfide polymers having, e.g. the formula $$HS-(C_2H_4-O-CH_2O-C_2H_4-S-S)_x-C_2H_4-O-CH_2O-C_2H_4-SH$$

oxidizers are added to convert the terminal SH groups to disulfide bridges so that rubberlike elastic products are formed.

To interrupt the above-mentioned reaction, the compound or composition in accordance with the invention contains chain-terminating agents and, if desired, an accelerator. The chain-terminating agents can include mercaptan group-containing compounds having the general formula $$R-SH \qquad (I)$$

or disulfide or polysulfide group-containing compounds having the general formula $$R-S_n-R \qquad (II)$$

in which formulas $n \geq 2$ and R is an alkyl, aryl or substituted alkyl or aryl residue, for instance, a residue selected from the group consiting of the alkyl- or arylcarboylic acids and their esters; benzyl or xylyl; hydroxyalkyl or hydroxyaryl.

In Formula II, the residues R may be the same or different.

The organic residue R must not be capable of entering into polyaddition or polycondensation reactions with itself, with mercapto groups and with oxidizers contained in the polymer system.

Chain-terminating agents or inhibitors which may be used in the compound in accordance with the invention include, e.g., monofunctional mercaptans, such as benzyl mercaptan, xylyl mercaptan or mercaptoethanol, also esters of mercaptoacetic acids, such as the nonyl, lauryl or 2-methoxyethyl esters thereof. 2-Mercaptoethanol is preferred. A suitable disulfide compound which acts as a chain-terminating agent is, e.g., dithiodiethylene glycol $$HO-CH_2-CH_2-S-S-CH_2-CH_2-OH.$$

During a curing process, the compounds having the formula I or II are capable of effecting a chain termination by the following reactions

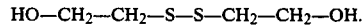

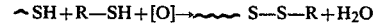
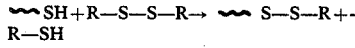

Besides, the compounds having the formulas I and II can act on and dissolve fully cured and aged polysulfide sealing compounds by the following reactions, by which the polymer chains are degraded:

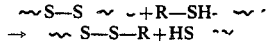

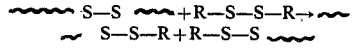

For this reason the undesired competing reaction $$2R-SH+[O] \rightarrow H_2O+R-S-S-R$$

taking place under cross-linking conditions will not affect the effectiveness of the chain-terminating agents.

The chain-terminating reaction may be accelerated by another additive, which may consist of a primary, secondary or tertiary alkylamine or arylamine, such as hexamethylene diamine, diethylamine or dibutylamine, triethylamine, dimethylaniline.

The invention relates also to a cleaning compound which contains an organic solvent and is intended for use with binary polyurethane systems which are mixed and handled by high-pressure plants. Such systems consist, e.g. of a base component including bifunctional or polyfunctional polyols, which may have been extended by a diisocyanate to form a prepolymer having terminal OH groups, and a cross-linking component including non-volatile diisocyanates, isocyanate adducts or polyfunctional isocyanates.

The cross-linking reaction in polyurethane systems usually consists of a polyaddition between a bi- or polyfunctional isocyanate and a bi- or polyfunctional compound that contains Zerewitinoff-active hydrogen atoms, in accordance with the following relation

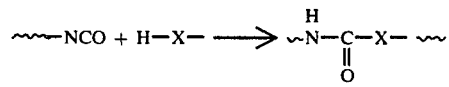

wherein

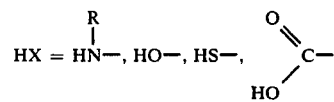

R=H or alkyl.

For use with binary polyurethane systems, suitable chain-terminating agents for use in the cleaning compound in accordance with the present invention include compounds which contain in the molecule a Zerewitinoff-active hydrogen atom and have the formula $$HY \ R^1$$

wherein

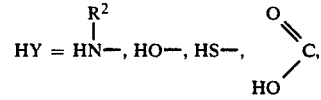

where $R^2$=H or alkyl
and $R_1$ is any desired organic radical, which will not enter into polyaddition or polycondensation reactions with itself or with isocyanate groups.

In the selection or proportioning of the chain-terminating agent or inhibitor it is essential that the functional groups H-X- must react with isocyanate groups at a higher rate than the Zerewitinoff-active components contained in the polymer system or that said groups are present in a high surplus.

For use with binary polyurethane systems, suitable chain-terminating agents contained in the compound in accordance with the invention include, e.g. primary or and secondary amines, such as diethylamine, dibutylamine, methylstearylamine, trimethylhexamethylene diamine; also monoalcohols, such as ethanol and its homologs, benzyl alcohol; polythermono alcohols, also phenol, cresol. Dimethylamine is suitably employed.

In another embodiment of the invention the chain-terminating agent of the cleaning solution for use with binary polyurethane systems may consist of a highly reactive monoisocyanate of the general formula $$R^3-NCO$$

wherein $R^3$ is an organic radical which has no group that is reactive with Zerewitinoff-active groups or with isocyanate groups. Such residues include, e.g. aryl residues or substitutes aryl residues. A suitable product which is commercially available is, e.g. toluene-4-sulfonyl isocyanate. This latter compound can be employed if the binary polyurethane system to be rinsed away comprises in its base component or in its cross-linking component highly reactive, bi- or polyfunctional amine components as well as diisocyanate components of low reactivity, which consist of free or blocked isocyanate prepolymers or isocyanate adducts.

The advantages afforded by the invention reside in that the compound or composition in accordance with the invention can be used in a simple, reliable and economical manner to clean high-pressure mixing and handling equipment by a removal of still soluble residue left after the handling, whereafter the solvents can be regenerated. In this manner the equipment can be kept free from curing residues and undesired stoppages and shutdowns will be avoided.

The invention will be explained more in detail and by way of example in the following Examples.

SPECIFIC EXAMPLES

Example 1

To prepare a cleaning compound, 1 gram 2-mercaptoethanol and 1.5 grams triethylamine are dissolved in 100 grams methylene chloride. 100 grams of the rinsing compound without an inhibitor and 100 grams of the inhibitor-containing rinsing compound are placed into respective 500-ml glass bottles. 40 grams partly mixed polysulfide sealing compound are added to each glass bottle and the mixture is intensely stirred with a blade-carrying stirrer. When the organic components have been completely dissolved, the mixtures are allowed to stand in the closed bottles.

In the solvent containing no inhibitor, reactive polysulfide sealing compounds will form after one day an elastic gel, which is no longer flowable. From the solvent which contains an inhibitor, a sediment consisting of fillers and additives forms under a supernatant solution which is clear or slightly cloudy. The settled sludge can easily be shaken up or filtered off.

Comparable results are produced with other inhibitors, such as the 2-ethoxyethyl ester of mercaptoacetic acid, or with other solvents, such as ethyl acetate, toluene, ethyl methyl ketone, dioxane, dimethyl sulfoxide, and other accelerators, such as dibutylamine, hexamethylene diamine.

Example 2

In a 500-ml glass bottle, 40 grams cured polysulfide sealing compound are added to 100 grams of the cleaning compound described in Example 1 and the mixture is intensely stirred with a blade-carrying stirrer. The cured sealing compound is dissolved to form a clear or slightly cloudy solution over a sediment consisting of solid, insoluble fillers and additives. The settled sludge can be shaken up or filtered off.

Comparable results are produced with other inhibitors, accelerators and solvents, such as are mentioned in Example 1.

Example 3

To prepare a cleaning compound, 1 gram diethylamine is dissolved in 100 grams methylene dichloride, 100 grams of the rinsing agent which contains no inhibitor and 100 grams of the cleaning compound which contains an inhibitor are placed into respective 500-ml glass bottles. 10 grams partly mixed polyurethane sealing compound are added to each bottle. Each mixture is intensely stirred with a blade-carrying stirrer. When the organic components have been completely dissolved, the mixtures are allowed to stand. In the solvent which contains no inhibitor, reactive polyurethane sealing materials form an elastic gel, which is no longer flowable, after one day. From the inhibitor-containing solvent, a sediment consisting of solid insoluble fillers and additives forms under a clear or slightly cloudy supernatant solution. The settled sludge can be shaken up or filtered off.

Comparable results are produced with other inhibitors, such as dibutylamine, methanol, ethanol, propanol, benzyl alcohol, methylstearylamine or toluene-4-sulfonylisocyanate.

What is claimed is:

1. A method of removing a polymeric residue from process equipment used in the handling and mixing of reactive multicomponent mixtures of liquid polysulfide polymers which react to form rubberlike high-polymeric polysulfide polymers, said method comprising the step of reacting residues of said high-polymeric polysulfide polymers with a solution of:
   (a) at least one chain-terminating or chain-degrading compound for said high-polymeric polysulfide polymers containing a mercaptan group of the formula $$R-SH$$

or a disulfide or polysulfide compound of the formula $$R-S_n-R$$

in which n is at least equal to 2 and R represents the same or different alkyl, aryl or substituted alkyl or aryl moieties in an amount sufficient to effect solubilization of said high-polymeric polysulfide polymers;
   (b) at least one amine as a reaction promoter compound in an amount sufficient to promote reaction of said chain-terminating or chain-degrading compound with said high-polymeric polysulfide polymers; and
   (c) an organic solvent for said chain-terminating or chain-degrading compound and said reaction promoter compound.

2. The method defined in claim 1 wherein said solution contains 0.5 to 30% by weight of said chain-terminating or chain-degrading compound.

3. The method defined in claim 2 wherein said chain-terminating or chain-degrading compound is selected from the group which consists of 2-ethoxyethyl, 2-methoxyethyl, nonyl or laurel mercaptoacetic acid esters, and dithiodiethylene glycol.

4. The method defined in claim 3 wherein said reaction promoter compound is selected from the group which consists of hexamethylenediamine, diethylamine, dibutylamine and triethylamine.

5. The method defined in claim 4 wherein said solvent is selected from the group which consists of methylene chloride, ethyl acetate, toluene methylethyl ketone, dioxane and dimethylsulfoxide, 6. A method of removing from process equipment used in the manufacture of liquid polysulfide polymers, a polymeric residue, which comprises the step of contacting said polymeric residue, with a 0.5 to 30 weight % solution of a polymerization inhibiting compound selected from the group consisting of 2-mercaptoethanol, and mercaptoacetic acid-2-ethoxyethyl ester in a solvent selected from the group consisting of methylene dichloride, ethyl acetate, toluene, methylethyl ketone, dioxane, and dimethyl sulfoxide, in the presence of a catalytically effective amount of a promoter selected from the group consisting of triethylamine, dibutylamine and hexamethylene diamine.

7. The method defined in claim 6 wherein the polymerization inhibiting compound is 2-mercaptoethanol, the solvent is methylene dichloride and the promoter is triethylamine.

8. A method of removing from process equipment used in the manufacture of polyurethanes, a polymeric residue, which comprises the step of contacting said polymeric residue, which comprises the step of contating said polymeric residue with a 0.5 to 30 weight % solution of a polymerization inhibiting compound selected from the group consisting of diethylamine, dibutylamine, methyl-stearyl-amine, and toluene-4-sulfonyl-isocyanate, in methylene dichloride.

9. The method defined in claim 8 wherein the polymerization inhibiting compound is diethylamine.

* * * * *